US006918087B1

(12) United States Patent
Gantt

(10) Patent No.: US 6,918,087 B1
(45) Date of Patent: Jul. 12, 2005

(54) VISUAL CLUES TO NAVIGATE THREE-DIMENSIONAL SPACE IN A COMPUTER-IMPLEMENTED GRAPHICS SYSTEM

(75) Inventor: Brian D. Gantt, Driftwood, TX (US)

(73) Assignee: Autodesk, Inc., San Rafael, CA (US)

(*) Notice: Subject to any disclaimer, the term of this patent is extended or adjusted under 35 U.S.C. 154(b) by 647 days.

(21) Appl. No.: 09/464,557

(22) Filed: Dec. 16, 1999

(51) Int. Cl.[7] .................................................. G09G 5/00

(52) U.S. Cl. ....................... 715/737; 715/738; 715/850; 715/856; 715/859; 715/852; 715/849

(58) Field of Search ................................ 345/737, 738, 345/850, 757, 856, 859, 664, 665, 852, 679, 680, 849, 848

(56) References Cited

U.S. PATENT DOCUMENTS 5,123,087 A 6/1992 Newell et al.
5,237,647 A 8/1993 Roberts et al.
5,371,845 A 12/1994 Newell et al.
5,396,590 A 3/1995 Kreegar
5,490,241 A 2/1996 Mallgren et al.
5,513,303 A 4/1996 Robertson et al.
5,513,309 A 4/1996 Meier et al.
5,572,639 A 11/1996 Gantt
5,704,028 A 12/1997 Schanel et al.
5,712,965 A 1/1998 Fujita et al.
5,734,805 A 3/1998 Isensee et al.
5,734,807 A 3/1998 Sumi
5,784,068 A 7/1998 Brown

FOREIGN PATENT DOCUMENTS

WO WO 95/11482 4/1995

*Primary Examiner*—Ba Huynh
*Assistant Examiner*—Mylinh Tran
(74) *Attorney, Agent, or Firm*—Gates & Cooper LLP

(57) ABSTRACT

A computer-implemented graphics system provides visual clues for navigating a three-dimensional space. The graphics system displays a two-dimensional viewport of the three-dimensional space on a monitor attached to the computer. A cursor is moved through the two-dimensional viewport of the three-dimensional space according to a position of the cursor control device attached to the computer. The graphics system determines a position of the cursor within the three-dimensional space relative to the two-dimensional viewport, and generates a visual representation of the cursor to indicate the position of the cursor within the three-dimensional space relative to the two-dimensional viewport. The visual representation of the cursor uses one or more human recognizable metaphors for three-dimensional distance cueing in order to provide an extra dimension of visual feedback to the operator navigating the cursor through the three-dimensional space related to the two dimensional viewport. This may include varying a composition, brightness, or reflectivity of the cursor to indicate the position of the cursor within the three-dimensional space relative to the two-dimensional viewport.

12 Claims, 9 Drawing Sheets

CURSOR MOVED (600)
DETERMINE CURSOR DISTANCE (602)
GENERATE CURSOR USING 3D DISTANCE CUES (604)
OTHER PROCESSING (606)
OUTPUT GRAPHICAL IMAGE (608)
END

VISUAL CLUES TO NAVIGATE THREE-DIMENSIONAL SPACE IN A COMPUTER-IMPLEMENTED GRAPHICS SYSTEM

CROSS-REFERENCE TO RELATED APPLICATIONS

This application is related to the following and commonly-assigned patent applications, all of which applications are incorporated by reference herein:

Application Ser. No. 08/774,241, filed on Nov. 5, 1996, by Brian D. Gantt, entitled "METHOD AND SYSTEM FOR INTERACTIVELY DETERMINING AND DISPLAYING GEOMETRIC RELATIONSHIPS BETWEEN THREE-DIMENSIONAL OBJECTS BASED ON PREDETERMINED GEOMETRIC CONSTRAINTS AND POSITION OF AN INPUT DEVICE", now U.S. Pat. No. 6,016,147, issued on Jan. 18, 2000;

Application Ser. No. 09/088,116, filed Jun. 1, 1998, by Lawrence D. Felser et al., entitled "POSITIONING AND ALIGNMENT AIDS FOR SHAPE OBJECTS HAVING AUTHORABLE BEHAVIORS AND APPEARANCES," now U.S. Pat. No. 6,232,983, issued on May 15, 2001;

Application Ser. No. 09/256,896, filed on Feb. 24, 1999, by Alexander Thoemmes et al., entitled "ACQUIRING AND UNACQUIRING ALIGNMENT AND EXTENSION POINTS,"; and Application Ser. No. 09/265,021, filed on Mar. 9, 1999, by Robert E. Bou, entitled "AFFINITIVE PLACEMENT BY PROXIMITY IN A COMPUTER-IMPLEMENTED GRAPHICS SYSTEM," now U.S. Pat. No. 6,417,865, issued on Jul. 9, 2002.

BACKGROUND OF THE INVENTION

1. Field of the Invention

The present invention relates generally to computer-implemented graphics systems, and in particular, to a method, apparatus, and article of manufacture for providing visual clues for navigating a three-dimensional space in a computer-implemented graphics system 2. Description of the Related Art Computer-implemented graphics systems have been widely used by designers, illustrators, drafters, and engineers for a number of years. Most such graphics systems use a two-dimensional (2D) graphical user interface (GUI) to display graphical images, such as 2D or three-dimensional (3D) models, schematic diagrams, photorealistic images, etc. When a 3D space is displayed in a 2D GUI, the operator is responsible for perceiving the third dimension, and is often aided by perspective views, rendering, shadows or other visual clues provided by the graphics systems.

A mouse is a typical input device used in graphics systems, wherein an associated cursor or other visual indicator is displayed on the 2D GUI to indicate a corresponding location. The difficulty for the operator is in perceiving the cursor location in a 3D space with only a 2D GUI for reference. Some graphics systems provide a mode of interaction where the system automatically suggests geometrically interesting points near the cursor for consideration in various operations. However, these systems work best in two dimensions where there is little ambiguity regarding the true location of the "interesting point" displayed.

Consequently, there is a need in the art for improved techniques for providing visual clues to navigate 3D space in graphics systems. Specifically, there is a need in the art for improved techniques for employing recognizable metaphors for interesting points for distance cueing to provide an extra dimension of visual feedback to the operator navigating through a 3D space.

SUMMARY OF THE INVENTION

To address the requirements described above, the present invention discloses a method, apparatus, and article of manufacture for providing visual clues for navigating a three-dimensional space in a computer-implemented graphics system. The graphics system displays a two-dimensional viewport of the three-dimensional space on a monitor attached to the computer. A cursor is moved through the two-dimensional viewport of the three-dimensional space according to a position of the cursor control device attached to the computer. The graphics system determines a position of the cursor within the three-dimensional space relative to the two dimensional viewport, and generates a visual representation of the cursor to indicate the position of the cursor within the three-dimensional space relative to the two-dimensional viewport. The visual representation of the cursor uses one or more human recognizable metaphors for three-dimensional distance cueing in order to provide an extra dimension of visual feedback to the operator navigating the cursor through the three-dimensional space related to the two-dimensional viewport. This may include varying a composition, brightness, or reflectivity of the cursor to indicate the position of the cursor within the three-dimensional space relative to the two-dimensional viewport.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer-implemented graphics system that provides improved visual clues for navigating a three-dimensional world space using a two-dimensional viewport.

Hardware and Software Environment

Figure 1:
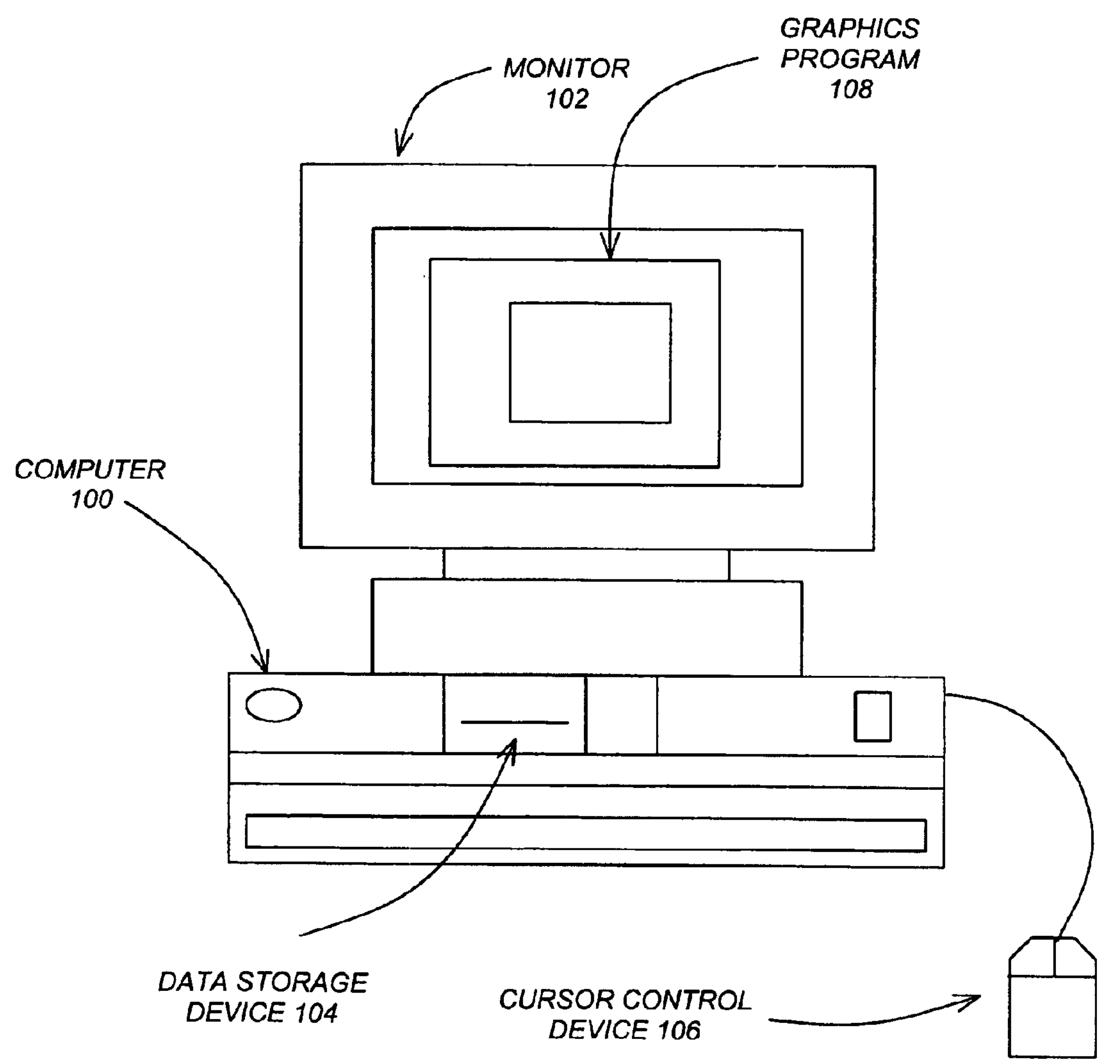
FIG. 1 is an exemplary hardware environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, cursor control devices 106, and other devices. Those skilled in the art will recognize that any combination of the above components, or any number of different components, peripherals, and other devices, may be used with the computer 100.

The preferred embodiment of the present invention is implemented by a computer-implemented graphics program 108, wherein the graphics program 108 is represented by a window displayed on the monitor 102. Generally, the graphics program 108 comprises logic and/or data embodied in or readable from a device, media, or carrier, e.g., one or more fixed and/or removable data storage devices 104 connected directly or indirectly to the computer 100, one or more remote devices coupled to the computer 100 via a data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
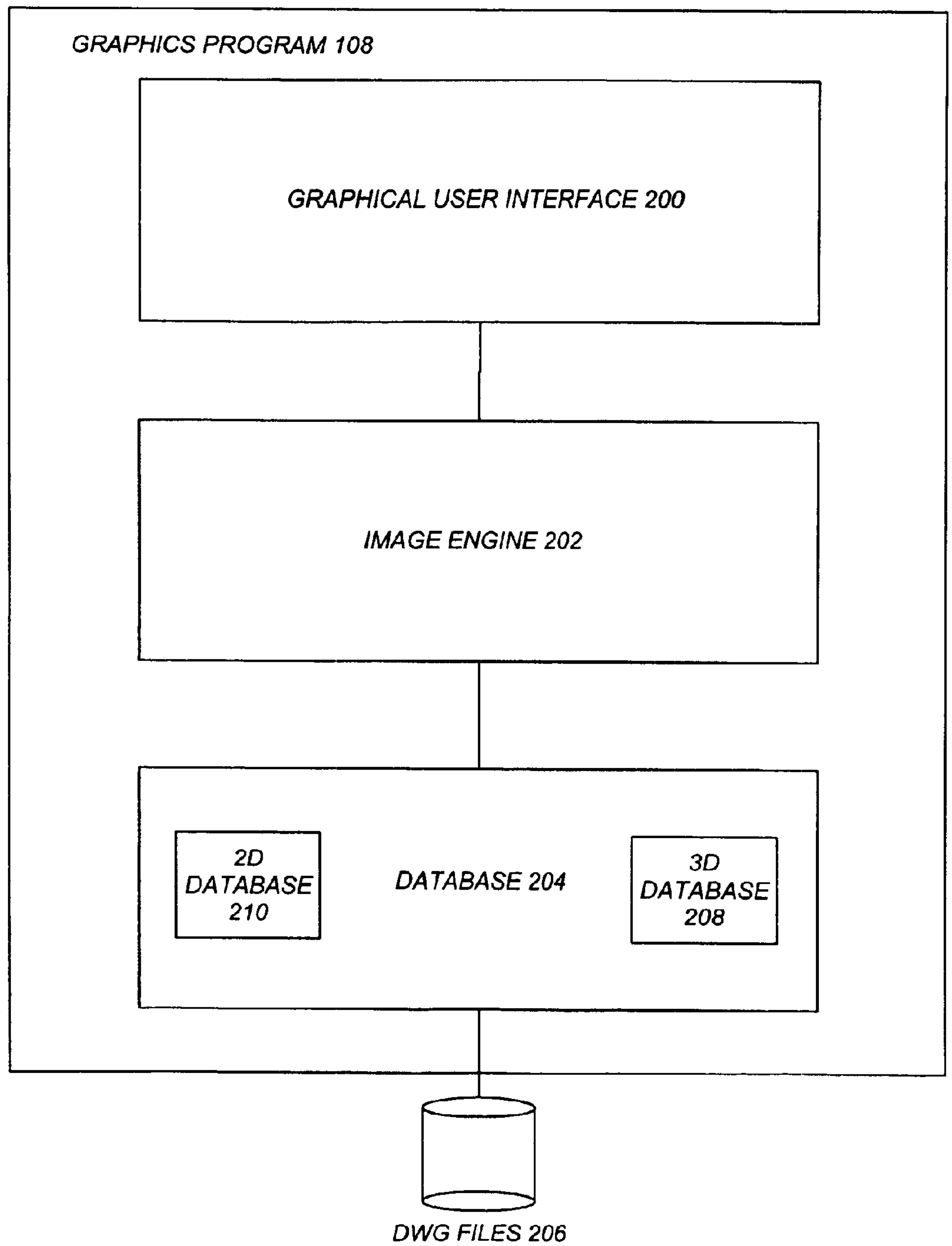
FIG. 2 is a block diagram that illustrates the components of the computer-implemented graphics program according to the preferred embodiment of the present invention.

FIG. 2 is a block diagram that illustrates the components of the graphics program 108 according to the preferred embodiment of the present invention. There are three main components to the graphics program 108, including: a Graphical User Interface (GUI) 200, an Image Engine (IME) 202, and a DataBase (DB) 204 for storing objects in Drawing (DWG) files 206.

The Graphical User Interface 200 displays information to the operator and provides the functionality for the operator's interaction with the graphics program 108.

The Image Engine 202 processes the DWG files 206 and delivers the resulting graphics to the monitor 110 for display. In the preferred embodiment, the Image Engine 202 provides a complete application programming interface (API) that allows other computer programs to interface to the graphics program 108 as needed.

The Database 204 is comprised of two separate types of databases: (1) a 3D database 208 known as the "3D world space" that stores 3D information; and (2) one or more 2D databases 210 known as the "2D viewports" that stores 2D information derived from the 3D information.

Object List

Figure 3:
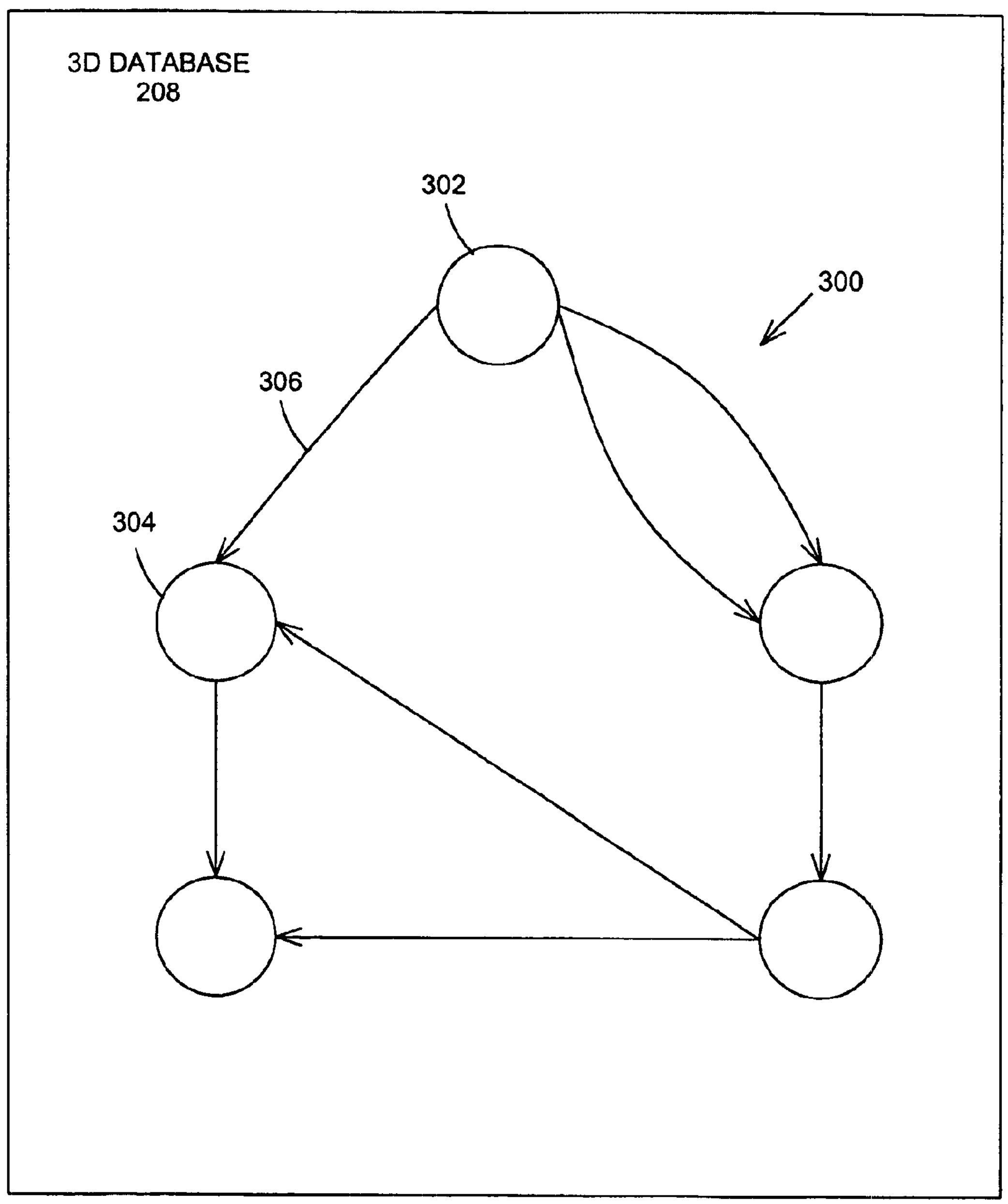
FIG. 3 is a block diagram that illustrates the structure of an object list maintained by each of the three-dimensional database of the computer-implemented graphics program according to the preferred embodiment of the present invention.

FIG. 3 is a block diagram that illustrates the structure of an object list 300 maintained by the 3D databases 208 according to the preferred embodiment of the present invention. The object list 300 is usually comprised of a list head 302 and one or more objects 304 interconnected by edges 306, although other structures may be used as well. There may be any number of different object lists 300 maintained by the 3D databases 208. Moreover, an object 304 nay be a member of multiple object lists 300 in the 3D databases 208.

Operation of the Graphics Program

The graphics program 108 includes functions for assisting the operator in ascertaining a relative location of a cursor within a 3D world space 208 using visual clues suitable for a 2D viewport 210. In the preferred embodiment, these functions employ human recognizable metaphors as visual clues for distance cueing in order to provide an extra dimension of visual feedback to the operator navigating a cursor through the 3D world space 208 using the 2D viewport 210.

Specifically, the functions include:

Specially rendered cursors to provide visual clues,

Varying the composition of the cursor to indicate distances,

Varying the brightness of the cursor to indicate distances, and

Varying the intensity of reflective cursors to indicate distances.

All of these visual clues can be combined with specific mouse 106 motions or other cursor control sequences to provide navigable points of interest that are readily perceived by the operator. The present invention thus simplifies the process of the operator learning how to navigate the 3D world space 208 that is displayed in the 2D viewports 210. As a result, the present invention enhances the utility of the computer-implemented 3D modeling by allowing a wider audience to master heretofore complex techniques for navigating in 3D world space 208.

In the preferred embodiment, the present invention displays visual clues to represent the relative position of the cursor when no objects having reference geometries are nearby. Imagine a 2D viewport 210 into a 3D world space 208 with no current geometry in the 2D viewport 210, but an active cursor. Is the cursor near the operator's point of view or far away? In the present invention, the visual clues provide enhanced depth cues for cursor control where no other information is found. Specifically, the visual clues use recognizable metaphors to indicate the depth of the current position of the cursor, especially in the absence of any other geometries, i.e., in empty space.

In contrast, the operator can usually correctly place the cursor in systems that provide a "snap points" on object geometries, by virtue of seeing the cursor "stick" to the snap points. Moreover, a cursor depth cue is probably redundant at an "interesting point" resulting from an intersection of existing object geometries. Only under certain circumstances, e.g., when multiple "interesting points" are displayed coincident, would depth cueing be beneficial.

On the other hand, the present invention uses visual clues to indicate cursor position as an extension of object geometries, i.e., at the "corners" bounded by existing non-intersecting object geometries. Consider, for example, use visual clues when the cursor is behind one object and to the right of another. On the other hand, these functions provide more of an indication of relative location of the cursor rather than an exact coordinate.

Exemplary Viewports

FIGS. 4A, 4B, 4C, and 4D are block diagrams that illustrate the display of cursors in 2D viewports displayed on a monitor by the computer-implemented graphics program according to the preferred embodiment of the present invention. AU of these 2D viewports 210 show how the Image Engine 202 specially renders cursors for display to illustrate distance.

Figure 4A:
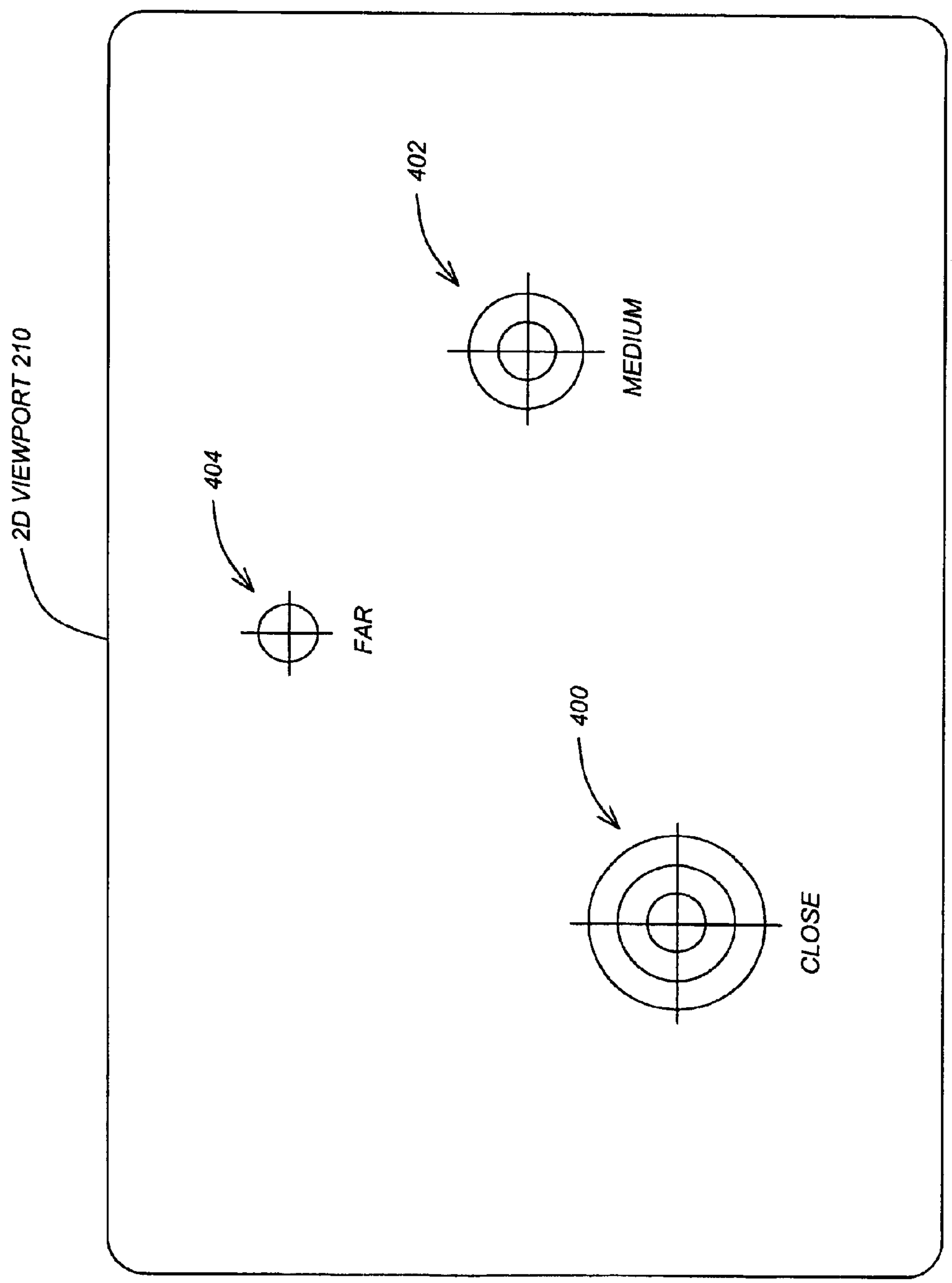
FIGS. 4A, 4B, 4C, and 4D are block diagrams that illustrate the display of cursors in 2D viewports displayed on a monitor by the computer-implemented graphics program according to the preferred embodiment of the present invention.

In the example of FIG. 4A, three cursors 400, 402, 404 are shown in a manner similar to recticles on a gun sight, wherein concentric rings are added or subtracted from the cursors 400, 402, 404 to indicate distance. As shown, cursor 400 is the closest, cursor 402 is a medium distance, and cursor 404 is the farthest away.

Figure 4B:
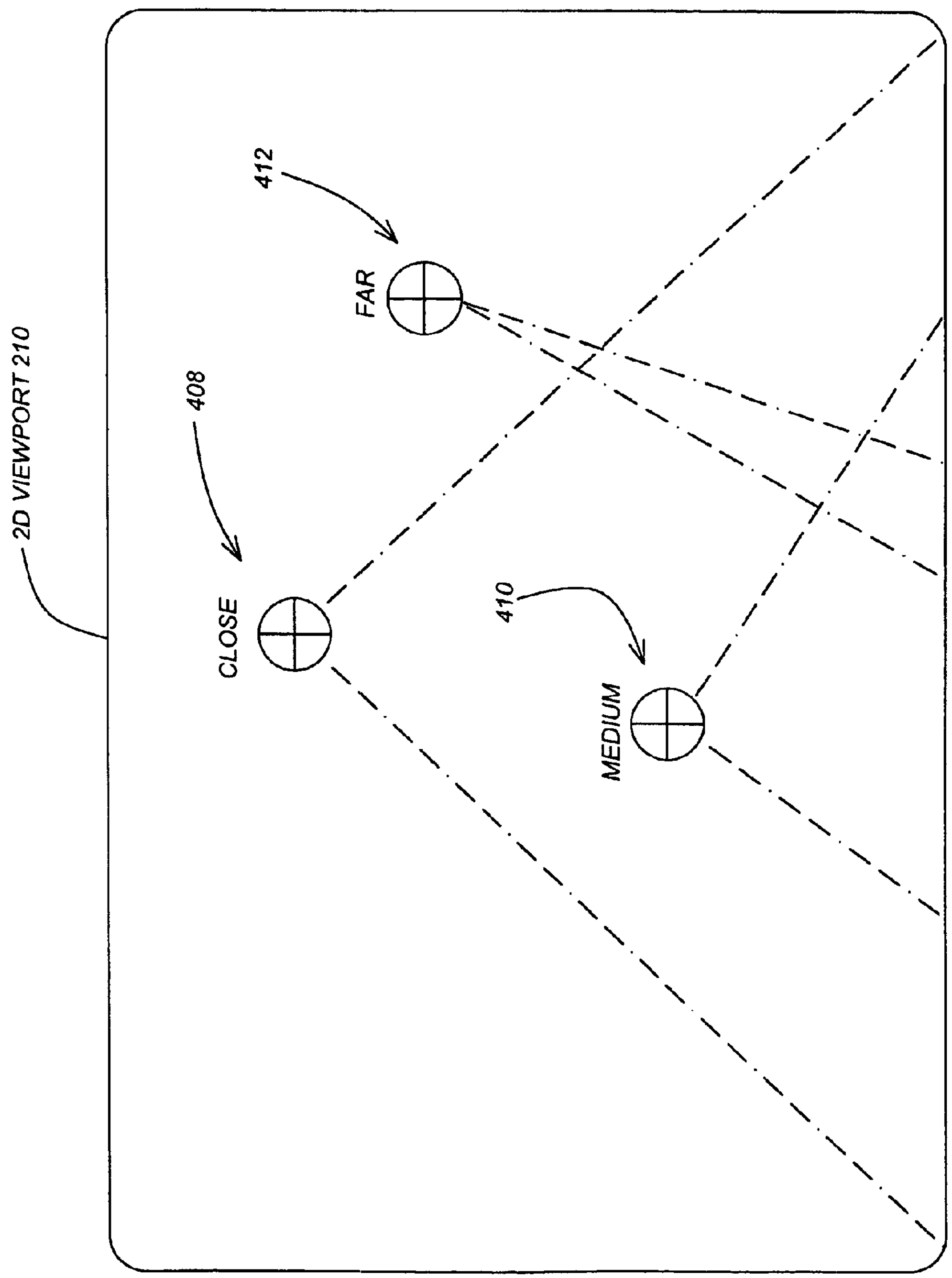

In the example of FIG. 4B, three cursors 406, 408, 410 are shown with projection lines emanating therefrom, in order to provide a perspective view to indicate distance. As shown, cursor 408 is the closest, cursor 410 is a medium distance, and cursor 412 is the farthest away.

Figure 4C:
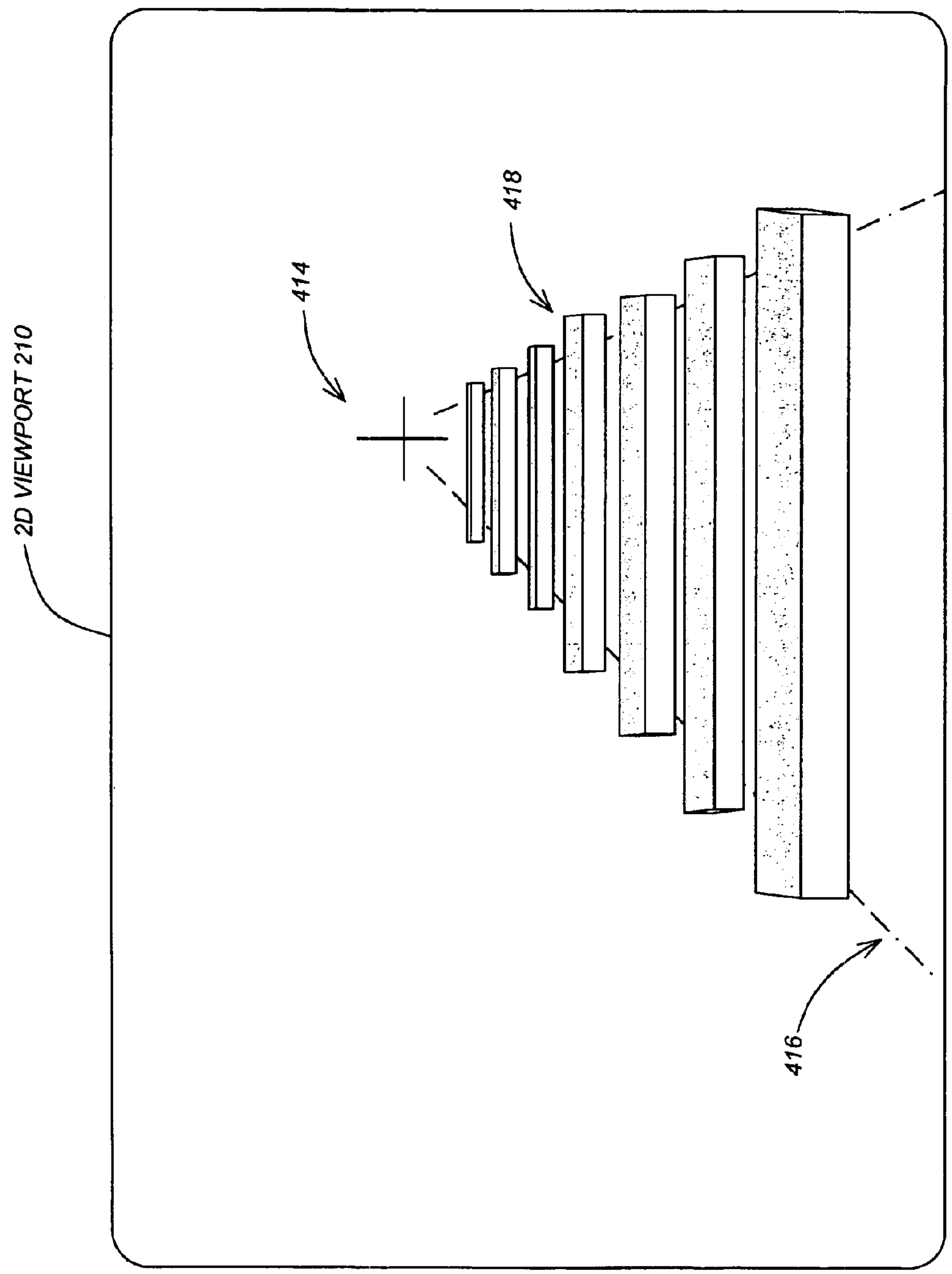

In the example of FIG. 4C, a single cursor 414 is shown with projection lines 416 emanating therefrom and "tag along" characters 418 (e.g., "railroad ties") being used to enhance the perspective view provided by the projection lines 416.

Figure 4D:
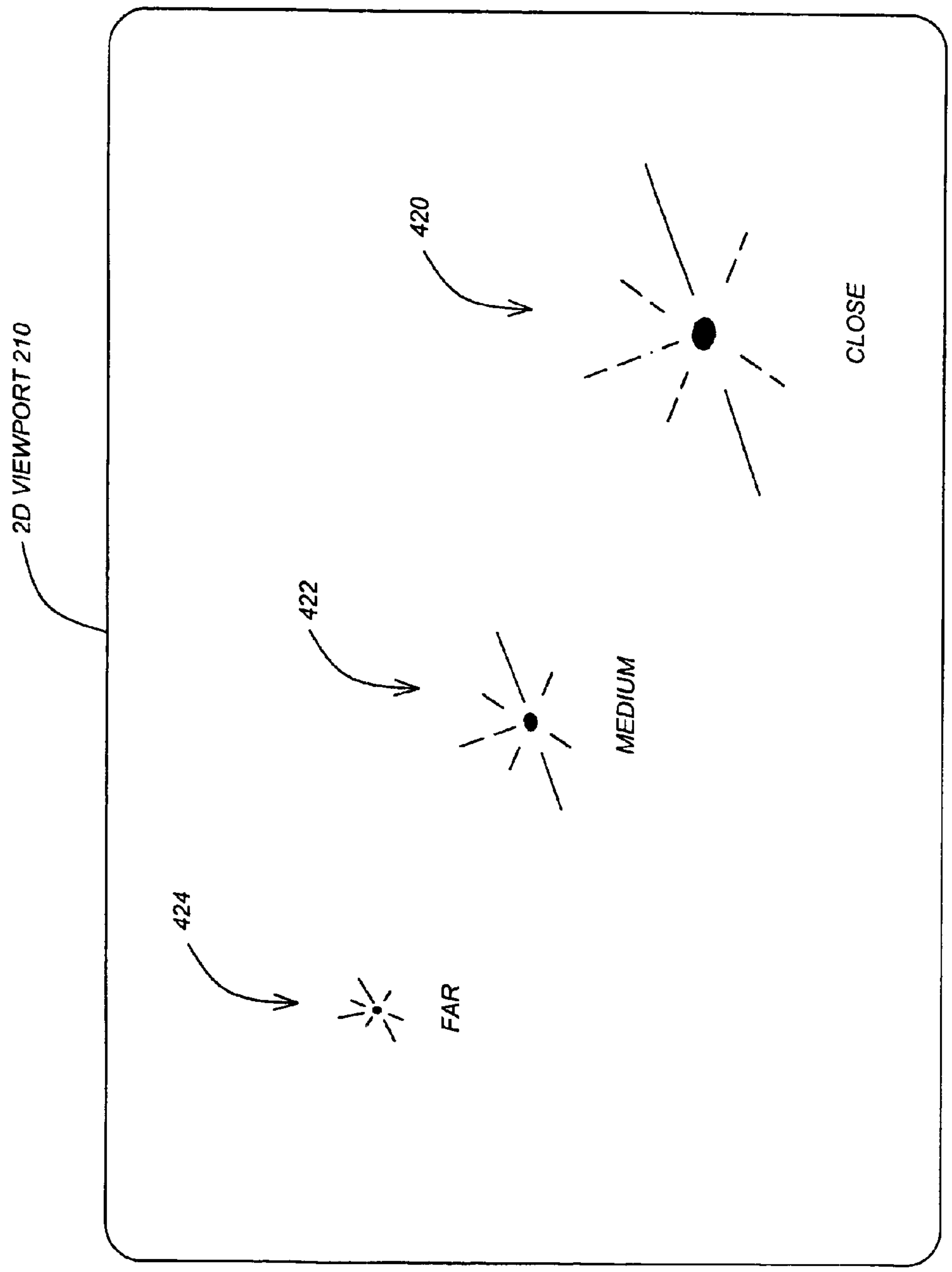

In the example of FIG. 4D, three cursors 420, 422, 424 are shown with luminosity lines emanating therefrom, in order to indicate distance by the brightness of the cursor. As shown, cursor 420 is the closest, cursor 422 is a medium distance, and cursor 424 is the farthest away. Specifically, the cursors 420, 422, 424 may be dimmed or brightened to provide visual clues as to distance.

In other embodiments, the composition, reflectivity, color, or other graphical aspect of the cursors may be varied to indicate distances or depth.

Logic of the Graphics Program

Figure 5:
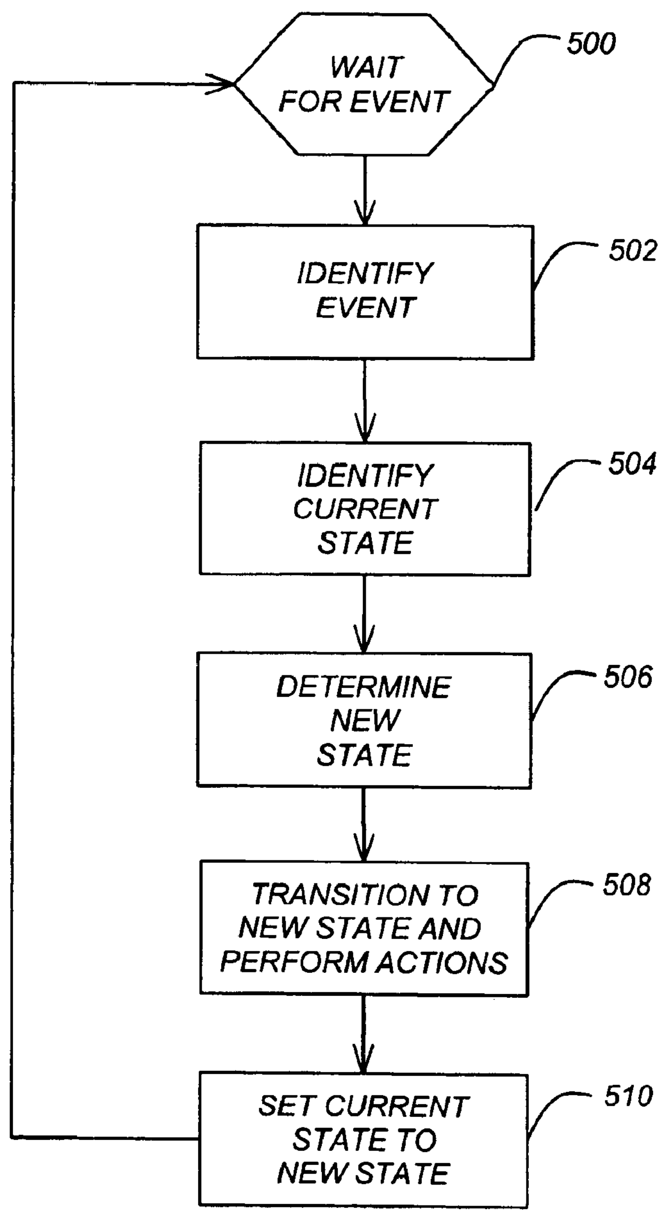
FIG. 5 is a flowchart that illustrates the general logic of a message or event-driven computer-implemented graphics program performing the steps of the preferred embodiment of the present invention.
Figure 6:
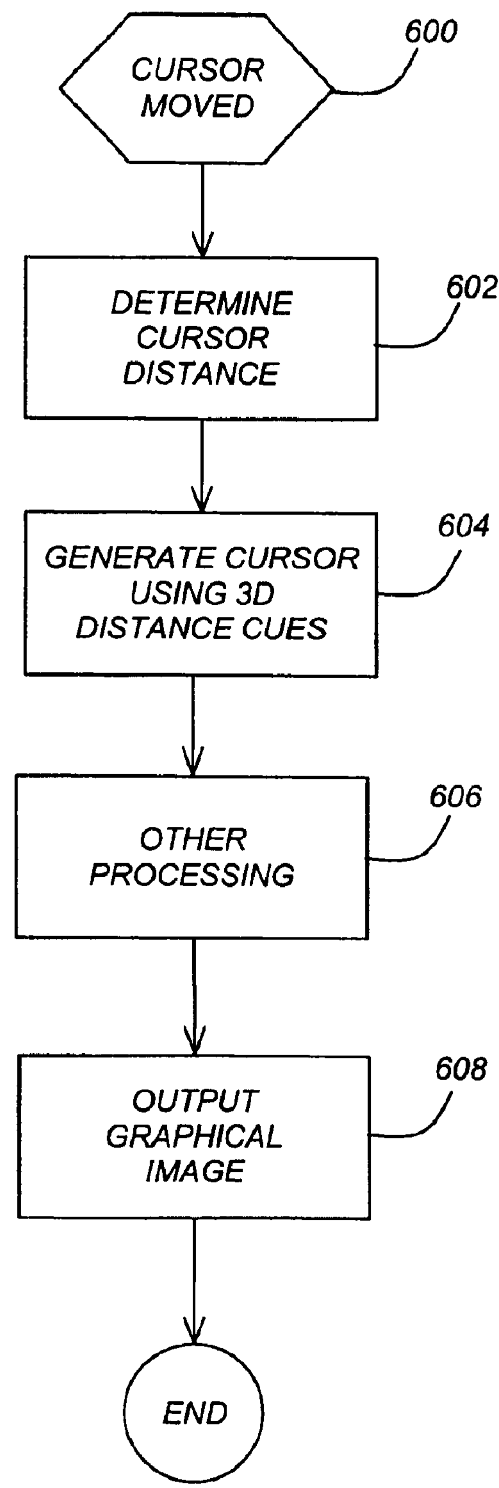
FIG. 6 is a flowchart that illustrates the general logic that is performed whenever the cursor approaches an interesting point according to the preferred embodiment of the present invention.

Flowcharts which illustrate the logic of the graphics program 108 according to the preferred embodiment of the present invention are shown in FIGS. 5 and 6. Those skilled in the art will recognize that this logic is provided for illustrative purposes only and that different logic may be used to accomplish the same results.

FIG. 5 is a flowchart that illustrates the general logic of a message or event-driven graphics program 108 performing the steps of the preferred embodiment of the present invention. In such a graphics program 108, operations are performed when transitions are made, based upon the receipt of messages or events, from present or current states to new states.

Generally, the flowchart begins by waiting at block 500 for an event (e.g., a mouse button click). It should be appreciated that, during this time, other operating system 116 tasks, e.g., file, memory, and video tasks, etc., may also be carried out. When an event occurs, control passes to block 502 to identify the event. Based upon the event, as well as the current state of the graphics program 108 determined in block 504, a new state is determined in block 506. In block 508, the logic transitions to the new state and performs any actions required for the transition. In block 510, the current state is set to the previously determined new state, and control returns to block 500 to wait for more input events.

The specific operations that are performed by block 508 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer 100.

FIG. 6 is a flowchart that illustrates the general logic that is performed according to the preferred embodiment of the present invention.

The logic begins at block 600 when the cursor is moved by the operator by means of the cursor control device 106 through the 2D viewport 210 of the 3D world space 208.

Block 602 represents the graphics program 108 determining the position of the cursor within the 3D world space 208 relative to the 2D viewport 210.

Block 604 represents the graphics program 108 processing the visual representation of the cursor to indicate the position of the cursor within the 3D world space 208 relative to the 2D viewport 210. Specifically, this Block represents the graphics program 108 generating the cursor using one or more human recognizable metaphors for 3D distance cueing in order to provide an extra dimension of visual feedback to the operator navigating the cursor through the 2D viewport 210 of the 3D world space 208.

Block 606 represents the graphics program 108 performing other processing on the objects 304.

Block 608 represents the graphics program 108 delivering the graphical image to an output device, such as a monitor 102, coupled to the computer 100.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or operating system providing graphical functions could benefit from the present invention.

In summary, the present invention discloses a method, apparatus, and article of manufacture for providing visual clues for navigating a three-dimensional space in a computer-implemented graphics system. The graphics system displays a two-dimensional viewport of the three-dimensional space on a monitor attached to the computer. A cursor is moved through the two-dimensional viewport of the three-dimensional space according to a position of the cursor control device attached to the computer. The graphics system determines a position of the cursor within the three-dimensional space relative to the two dimensional viewport, and generates a visual representation of the cursor to indicate the position of the cursor within the three-dimensional space relative to the two-dimensional viewport. The visual representation of the cursor uses one or more human recognizable metaphors for three-dimensional distance cueing in order to provide an extra dimension of visual feedback to the operator navigating the cursor through the three-dimensional space related to the two-dimensional viewport. This may include varying a composition, brightness, or reflectivity of the cursor to indicate the position of the cursor within the three-dimensional space relative to the two-dimensional viewport.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for providing visual clues for navigating a three-dimensional space represented in a computer-implemented graphics system, comprising:

(a) displaying a two-dimensional viewport of the three-dimensional space on a monitor attached to the computer;

(b) moving a cursor through the two-dimensional viewport of the three-dimensional space according to a position of an input device attached to the computer;

(c) determining a position of the cursor within the three-dimensional space relative to the two-dimensional viewport; and (d) generating a visual representation of the cursor to indicate the position of the cursor within the three-dimensional space relative to the two-dimensional viewport, wherein the generating step comprises varying a reflectivity of the cursor to indicate the position of the cursor within the three-dimensional space relative to the two-dimensional viewport.

2. A computer-implemented method for providing visual clues for navigating a three-dimensional space represented in a computer-implemented graphics system, comprising:

(a) displaying a two-dimensional viewport of the three-dimensional space on a monitor attached to the computer;

(b) moving a cursor through the two-dimensional viewport of the three-dimensional space according to a position of an input device attached to the computer;

(c) determining a position of the cursor within the three-dimensional space relative to the two-dimensional viewport; and (d) generating a visual representation of the cursor to indicate the position of the cursor within the three-dimensional space relative to the two-dimensional viewport, wherein the generating step comprises adding and subtracting concentric circles about the cursor to indicate the position of the cursor within the three-dimensional space relative to the two-dimensional viewport.

3. A computer-implemented method for providing visual clues for navigating a three-dimensional space represented in a computer-implemented graphics system, comprising:

(a) displaying a two-dimensional viewport of the three-dimensional space on a monitor attached to the computer;

(b) moving a cursor through the two-dimensional viewport of the three-dimensional space according to a position of an input device attached to the computer;

(c) determining a position of the cursor within the three-dimensional space relative to the two-dimensional viewport; and (d) generating a visual representation of the cursor to indicate the position of the cursor within the three-dimensional space relative to the two-dimensional viewport, wherein the generating step comprises adding and subtracting projection lines to the cursor to indicate the position of the cursor within the three-dimensional space relative to the two-dimensional viewport.

4. A computer-implemented method for providing visual clues for navigating a three-dimensional space represented in a computer-implemented graphics system, comprising:

(a) displaying a two-dimensional viewport of the three-dimensional space on a monitor attached to the computer;

(b) moving a cursor through the two-dimensional viewport of the three-dimensional space according to a position of an input device attached to the computer;

(c) determining a position of the cursor within the three-dimensional space relative to the two-dimensional viewport; and (d) generating a visual representation of the cursor to indicate the position of the cursor within the three-dimensional space relative to the two-dimensional viewport, wherein the generating step comprises adding and subtracting tag along characters to the cursor to indicate the position of the cursor within the three-dimensional space relative to the two-dimensional viewport.

5. A computer-implemented graphics system for providing visual clues for navigating a three-dimensional space, comprising:

(a) a computer having a monitor attached thereto;

(b) means, performed by the computer, for displaying a two-dimensional viewport of the three-dimensional space on the monitor attached to the computer;

(c) means, performed by the computer, for moving a cursor through the two-dimensional viewport of the three-dimensional space according to a position of an input device attached to the computer;

(d) means, performed by the computer, for determining a position of the cursor within the three-dimensional space relative to the two-dimensional viewport; and (e) means, performed by the computer, for generating a visual representation of the cursor to indicate the position of the cursor within the three-dimensional space relative to the two-dimensional viewport, wherein the means for generating comprises means for varying a reflectivity of the cursor to indicate the position of the cursor within the three-dimensional space relative to the two-dimensional viewport.

6. A computer-implemented graphics system for providing visual clues for navigating a three-dimensional space, comprising:

(a) a computer having a monitor attached thereto;

(b) means, performed by the computer, for displaying a two-dimensional viewport of the three-dimensional space on the monitor attached to the computer;

(c) means, performed by the computer, for moving a cursor through the two-dimensional viewport of the three-dimensional space according to a position of an input device attached to the computer;

(d) means, performed by the computer, for determining a position of the cursor within the three-dimensional space relative to the two-dimensional viewport; and (e) means, performed by the computer, for generating a visual representation of the cursor to indicate the position of the cursor within the three-dimensional space relative to the two-dimensional viewport, wherein the means for generating comprises means for adding and subtracting concentric circles about the cursor to indicate the position of the cursor within the three-dimensional space relative to the two-dimensional viewport.

7. A computer-implemented graphics system for providing visual clues for navigating a three-dimensional space, comprising:

(a) a computer having a monitor attached thereto;

(b) means, performed by the computer, for displaying a two-dimensional viewport of the three-dimensional space on the monitor attached to the computer;

(c) means, performed by the computer, for moving a cursor through the two-dimensional viewport of the three-dimensional space according to a position of an input device attached to the computer;

(d) means, performed by the computer, for determining a position of the cursor within the three-dimensional space relative to the two-dimensional viewport; and (e) means, performed by the computer, for generating a visual representation of the cursor to indicate the position of the cursor within the three-dimensional space relative to the two-dimensional viewport, wherein the means for generating comprises means for adding and subtracting projection lines to the cursor to indicate the position of the cursor within the three-dimensional space relative to the two-dimensional viewport.

8. A computer-implemented graphics system for providing visual clues for navigating a three-dimensional space, comprising:

(a) a computer having a monitor attached thereto;

(b) means, performed by the computer, for displaying a two-dimensional viewport of the three-dimensional space on the monitor attached to the computer;

(c) means, performed by the computer, for moving a cursor through the two-dimensional viewport of the three-dimensional space according to a position of an input device attached to the computer;

(d) means, performed by the computer, for determining a position of the cursor within the three-dimensional space relative to the two-dimensional viewport; and (e) means, performed by the computer, for generating a visual representation of the cursor to indicate the position of the cursor within the three-dimensional space relative to the two-dimensional viewport, wherein the means for generating comprises means for adding and subtracting tag along characters to the cursor to indicate the position of the cursor within the three-dimensional space relative to the two-dimensional viewport.

9. An article of manufacture embodying logic for performing a method for providing visual clues for navigating a three-dimensional space represented in a computer-implemented graphics system, the method comprising:

(a) displaying a two-dimensional viewport of the three-dimensional space on a monitor attached to the computer;

(b) moving a cursor through the two-dimensional viewport of the three-dimensional space according to a position of an input device attached to the computer;

(c) determining a position of the cursor within the three-dimensional space relative to the two-dimensional viewport; and (d) generating a visual representation of the cursor to indicate the position of the cursor within the three-dimensional space relative to the two-dimensional viewport, wherein the generating step comprises varying a reflectivity of the cursor to indicate the position of the cursor within the three-dimensional space relative to the two-dimensional viewport.

10. An article of manufacture embodying logic for performing a method for providing visual clues for navigating a three-dimensional space represented in a computer-implemented graphics system, the method comprising:

(a) displaying a two-dimensional viewport of the three-dimensional space on a monitor attached to the computer;

(b) moving a cursor through the two-dimensional viewport of the three-dimensional space according to a position of an input device attached to the computer;

(c) determining a position of the cursor within the three-dimensional space relative to the two-dimensional viewport; and (d) generating a visual representation of the cursor to indicate the position of the cursor within the three-dimensional space relative to the two-dimensional viewport, wherein the generating step comprises adding and subtracting concentric circles about the cursor to indicate the position of the cursor within the three-dimensional space relative to the two-dimensional viewport.

11. An article of manufacture embodying logic for performing a method for providing visual clues for navigating a three-dimensional space represented in a computer-implemented graphics system, the method comprising:

(a) displaying a two-dimensional viewport of the three-dimensional space on a monitor attached to the computer;

(b) moving a cursor through the two-dimensional viewport of the three-dimensional space according to a position of an input device attached to the computer;

(c) determining a position of the cursor within the three-dimensional space relative to the two-dimensional viewport; and (d) generating a visual representation of the cursor to indicate the position of the cursor within the three-dimensional space relative to the two-dimensional viewport, wherein the generating step comprises adding and subytracting projection lines to the cursor to indicate the position of the cursor within three-dimensional space relative to the two-dimensional viewport.

12. An article of manufacture embodying logic for performing a method for providing visual clues for navigating a three-dimensional space represented in a computer-implemented graphics system, the method comprising:

(a) displaying a two-dimensional viewport of the three-dimensional space on a monitor attached to the computer;

(b) moving a cursor through the two-dimensional viewport of the three-dimensional space according to a position of an input device attached to the computer;

(c) determining a position of the cursor within the three-dimensional space relative to the two-dimensional viewport; and (d) generating a visual representation of the cursor to indicate the position of the cursor within the three-dimensional space relative to the two-dimensional viewport, wherein the generating step comprises adding and subtracting tag along characters to the cursor to indicate the position of the cursor within the three-dimensional space relative to the two-dimensional viewport.

* * * * *

UNITED STATES PATENT AND TRADEMARK OFFICE

CERTIFICATE OF CORRECTION

PATENT NO. : 6,918,087 B1
DATED : July 12, 2005
INVENTOR(S) : Gantt

It is certified that error appears in the above-identified patent and that said Letters Patent is hereby corrected as shown below:

Column 10,
Line 30, “subytracting” should read -- subtracting --.

Signed and Sealed this

Twentieth Day of September, 2005

JON W. DUDAS
*Director of the United States Patent and Trademark Office*